Nov. 8, 1949     A. C. RUGE     2,487,595
LOAD CELL
Filed March 25, 1947
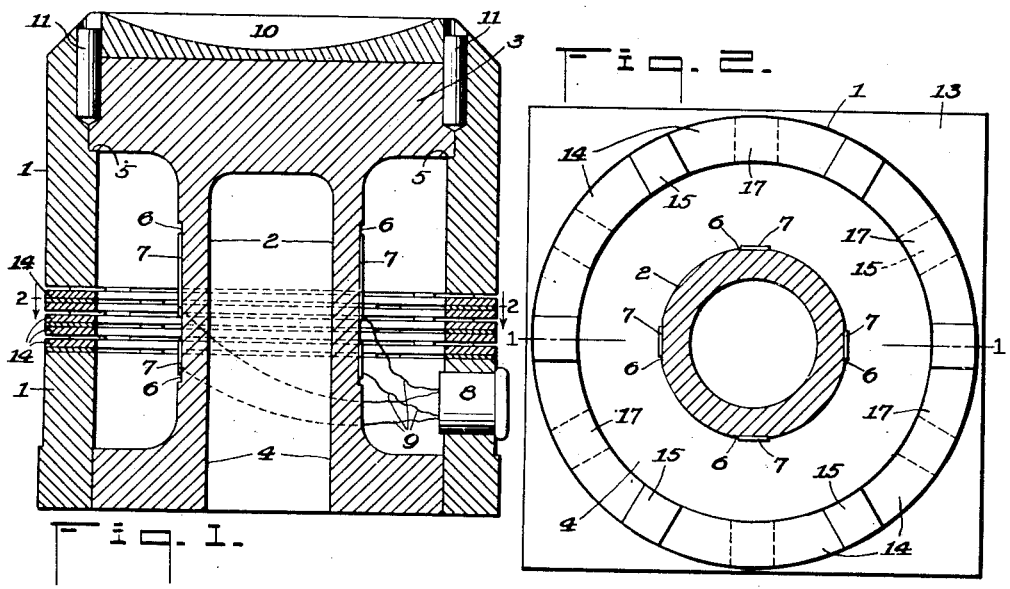
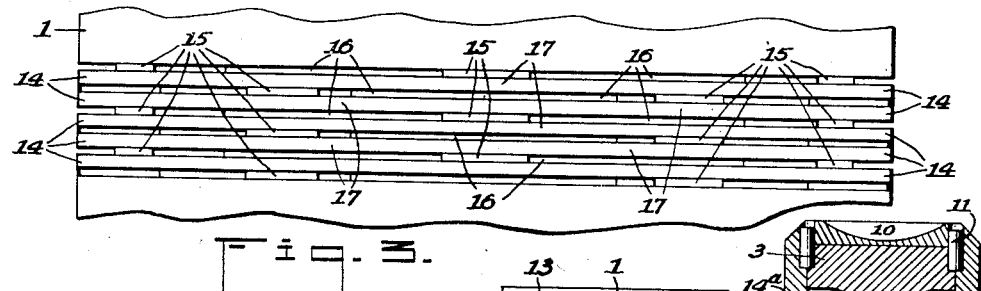
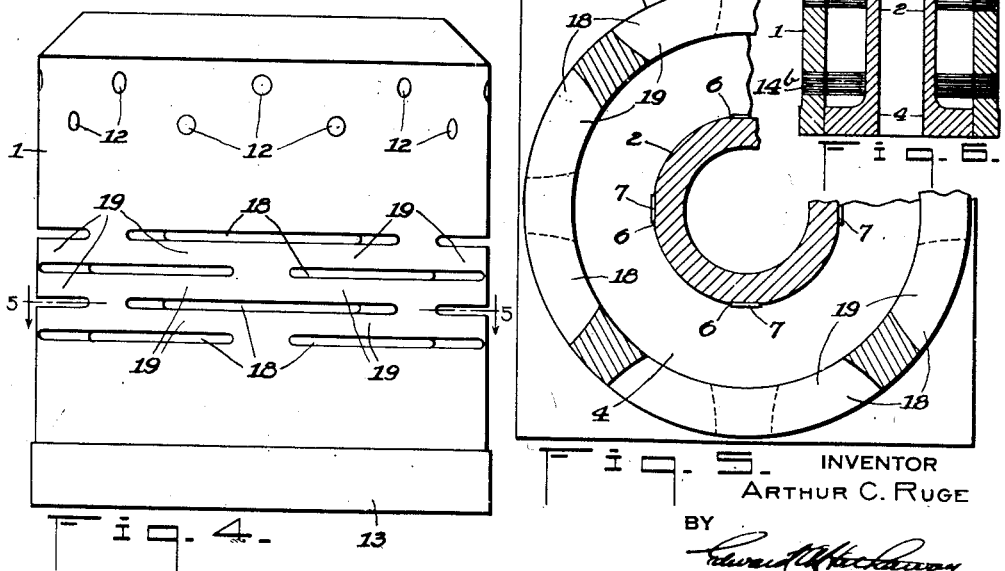
INVENTOR
ARTHUR C. RUGE
BY
ATTORNEY Patented Nov. 8, 1949

2,487,595

UNITED STATES PATENT OFFICE 2,487,595

LOAD CELL

Arthur C. Ruge, Cambridge, Mass., assignor to The Baldwin Locomotive Works, a corporation of Pennsylvania Application March 25, 1947, Serial No. 736,955

4 Claims. (Cl. 73—141)

This invention relates generally to load weighing devices and more particularly to an improved torsion-resistant axially flexible load cell which is used broadly to determine the magnitude of loads and forces.

It is important that if torque loads are present their effects on the load weighing device should be excluded or reduced to a minimum so that an accurate determination of the axial load may be obtained. This is particularly true where an axial load is created by a rotating element as, for instance, the screw-down screw of a rolling mill. In these instances, the rotating force of the screw is very easily transmitted to the load cell, creating torque strains therein and in the load sensitive element of the cell. Also the matter of safety often becomes important. The torque may be very large and the load weighing device too weak to carry it.

It is well-known practice to provide mechanical stops to prevent transmission of torque to the sensitive element, but such arrangements introduce errors due to friction which render accurate measurement impossible. It is one object of my invention to provide means of avoiding such errors.

It is another object of my invention to provide an improved load cell that will effectively resist undesired torque forces, while permitting a high degree of axial flexibility to insure sensitivity and accuracy.

Other objects and advantages will be more apparent to those skilled in the art from the following description of the accompanying drawings in which:

Fig. 1 is a vertical section of a load cell, taken along the line 1—1 of Fig. 2, showing the application of my shell to the unit;

Fig. 2 is a horizontal section of the load cell, taken along the line 2—2 of Fig. 1 in the direction of the arrows;

Fig. 3 is an enlarged elevation of a portion of my shell, showing a construction of the flexible part thereof;

Fig. 4 is an elevation of a modified shell; and

Fig. 5 is a horizontal section of the modified shell, taken along the line 5—5 of Fig. 4 in the direction of the arrows.

Fig. 6 is a sectional view of cell employing multiple flexible shell sections.

In the particular embodiment of the invention which is disclosed herein merely for the purpose of illustrating one specific form among possible others that the invention might take in practice, I have shown a load cell comprising a heavy tubular outer casing or shell 1 within which is disposed a longitudinally extending, i. e., axial, primary load carrying column 2 having an upper flanged portion 3 and a lower flanged portion or base 4, both integral with the load carrying column. While the column 2 is shown as cylindrical in cross section and as being only one in number, it will of course be understood that any other cross sectional shape and any other number of columns may be used as shown in various copending applications of mine. Also, it will be seen that the invention applies equally well to measurement of tension by obvious variation of details. Upper flanged portion 3 rests upon an annular ledge 5 formed in the inner upper wall of the tubular shell. From its lower end the load carrying column is bored its entire length or approximately three-quarters of the height of the unit, leaving intact upper flanged portion 3. Four flat surfaces 6 are formed in the cylindrical outer wall of load carrying column 2 at ninety degree intervals, to which surfaces electrical strain gages 7, hereinafter more particularly described, are affixed. An outlet receptacle 8, to which wires 9 from the strain gages are connected, is fitted into a wall of tubular shell 1 for convenient attachment to indicating apparatus (not shown). A cylindrical thrust plate 10 rests upon the load carrying column and is shown as having, specifically, a concave upper surface to fit the spherical ended screw which transmits load, for example, to the rolls of a rolling mill.

To secure load carrying column 2 and thrust plate 10 within tubular shell 1 so that the shell will effectively resist torque that would otherwise be transmitted by a rotating load to the load carrying column, I find that the means shown in Figs. 1 and 4 are most effective and economical. In Fig. 1, I arrange a number of dowel pins 11 circumferentially between the inner wall of the tubular shell and the outer sides of the upper flanged portion and of the upper flanged portion and of the thrust plate, to serve as keys, the keyways therefor being vertical holes drilled in all three members or only in 1 and 3 if it is desired to leave plate 10 free to turn. In Fig. 4, a number of dowel pins 12 are radially disposed in horizontal holes drilled through the tubular shell and part of the way into upper flanged portion 3. Both arrangements effectively resist torque. Brazing or welding can of course be used if convenient disassembly is not required. The lower part of the tubular shell is also preferably formed into a square or other angular base 13 so that the entire load cell may be securely held against turning.

To create longitudinal flexibility in the tubular shell while still offering a high degree of torsional resistance, I illustrate two constructions that may be employed. In Figs. 1 to 3, I show the preferred form which consists of having a portion of the tubular shell made up of a plurality of metal rings or annular flex plates 14, preferably having the same diameters as the inner and outer diameters of the tubular shell itself. These flex plates are separated at equal intervals by metal spacers 15 of uniform size to create slotted openings 16 of equal length in the wall of the tubular shell. Any suitable number of spacers may be used in each annular interstice between the flex plates. More than one of such sets of flex plates 14a and 14b, Fig. 6, may be situated along the length of the tube if desired. This gives a maximum torque resistance with a minimum longitudinal stiffness. While the spacers in the various interstices in any of the forms may be arranged in any pattern that provides a staggering of the spacers, that is, an arrangement where the spacers in two adjacent interstices are not in vertical alignment, the preferred arrangement is shown in Figs. 2 and 3. An even number of spacers are placed at equal intervals in each interstice but spacers only in alternate interstices are in vertical alignment, the spacers in the other interstices being in vertical alignment halfway between the first mentioned alignments. In this pattern each spacer rests upon a portion of a flex plate that is midway over a slotted opening. It is obvious that the horizontal distance between the spacers is of importance in determining the degree of longitudinal flexibility that the shell will possess. The greater the intervals between the spacers, the greater will be such flexibility, while decreasing such intervals results in a decrease in such flexibility. Varying this interval distance may be accomplished by using more or fewer spacers or by increasing or reducing the width of each spacer. The flex plates and spacers are permanently fastened in the pattern chosen by brazing or welding or other means. The assembly is then inserted between two transverse sections of the tubular shell and the spacers on the outer sides of the top and bottom flex plates similarly affixed to the tubular shell to form an integrated load cell-shell, compact, rugged and durable, that possesses a high degree of longitudinal flexibility due to the natural flexibility of the metal in those portions 17 of the flex plates lying between adjacent spacers in each interstice. The entire outer shell assembly may be furnace brazed in a single operation, this being the preferred method from the standpoint of economy.

In Figs. 4 and 5, I show a modified form of providing longitudinal flexibility to the tubular shell. It consists of a number of parallel saw cuts 18 preferably of equal length made through the walls of tubular shell 1 such as by a circular saw. These saw cuts are at right angles to the axis of the tubular shell and are also in staggered relationship with each other, as in the case of the slotted openings in the preferred form above described. Longitudinal flexibility of the shell is obtained in this modification from the natural flexibility of the metal remaining between the saw cuts at points 19. As in the case of the preferred form, a range of degrees of flexibility is possible. Greater flexibility may be obtained by lengthening the saw cuts or by placing the cuts closer together longitudinally. On the other hand, flexibility may be lessened by shortening the length of the saw cuts or spacing the cuts farther apart longitudinally.

While the load weighing element may be in the form of a proving ring or any other structure that responds to load, as shown in my co-pending application Serial No. 654,246, filed March 14, 1946, which application matured into Patent No. 2,472,047 on May 31, 1949, I prefer for many applications to use a simple column type sensitive weighing element employing electrical strain gages of the type disclosed in Patent No. 2,292,549 and my Patent No. 2,390,038. Therefore, to each of four or more flatted surfaces 6, formed on and at equally spaced points around the cylindrical outer wall of load carrying column 2, I cement or otherwise bond preferably two of said strain gages 7, the filament of one gage being vertically disposed, the other horizontally to compensate for temperature changes. To indicate the load the strain gages 7 are connected into a suitable Wheatstone bridge (not shown). Other gage arrangements are practical. For instance, in a hollow column, I may also place gages inside the bore to get a better average of the longitudinal strains. In some cases, I may put a great many gages on the outer surface instead of the four places shown. Such details are not a part of my present invention.

Both the above forms of tubular shell are, however, adequately effective to perform the dual functions of resisting to a high degree a large amount of torque that may tend to enter the load cell and distort its accuracy or to damage it, while at the same time preserving adequate longitudinal flexibility therein to measure the load. Not only is an extremely small percentage of the total axial load transmitted to the shell, whether of the preferred or modified form, but also the arrangement of staggered slotted openings retains sufficient strength in the walls of the shell to resist relatively large torque forces.

*Operation.*—A load to be weighed as, for instance, by applying a rotating screw-down screw of a rolling mill to thrust plate 10 causes the colum 2 to be strained and accordingly strain the filaments of gages 7, thereby varying the electrical resistance of the strain gages to indicate the load on the indicating apparatus. In view of the longitudinal flexibility of the tubular shell, the load is carried almost entirely by primary load carrying column 2, it being estimated that in a certain practical design which has actually been built less than two per cent of the total load is transmitted to the tubular shell through engagement of upper flanged portion 3 with annular ledge 5. This small percentage of the load compresses the flexible assembly of flex plates and spacers in the manner above described, to permit the bulk of the load to be carried by the load carrying column to which the load weighing element is attached. Torque forces, which might be created by a load, are effectively resisted by the arrangement of dowel pins 11 shown in Fig. 1 or by the modified arrangement of dowel pins 12 shown in Fig. 4 or other means. The square or angular base 13, securely held as, for instance, within a similarly shaped recess on top of the bearing housing of a rolling mill, prevents rotation of the shell when in position.

From the disclosure herein, it is seen that I have provided a compact, rugged and durable, yet simple and inexpensive, load cell that effectively resists torque forces while at the same time providing a high degree of longitudinal flexibility for the purpose of weighing the load.

It will, of course, be understood by those skilled in the art that various changes may be made in the construction and arrangement of parts without departing from the spirit of the invention as set forth in the appended claims.

I claim:

1. In a load cell, load sensitive means adapted to be responsive to loads applied axially thereof, means to receive loads and transmit the same to said sensitive means, an axially extending shell external of said sensitive means and operatively connected thereto, and said shell having circumferentially extending sections axially spaced from each other but with adjacent sections operatively connected to each other at circumferentially spaced points, and said sections being operatively connected to the remainder of said shell at points circumferentially offset from the other points of connection, whereby the shell affords a degree of torsional resistance which is high as compared with that of the load-sensitive means, while at the same time affording a resistance to axial loads which is low compared with that of the load-sensitive means.

2. The combination set forth in claim 1 further characterized in that the shell is of tubular form and the axially spaced circumferentially extending sections comprise flex plates connected to each other and to said shell by staggered spacers to provide slotted openings between the sections to allow flexing thereof in response to axially applied loads.

3. The combination set forth in claim 1 further characterized in that the load sensitive element is a hollow cylinder.

4. The combination set forth in claim 1 further characterized in that the load sensitive element is a hollow cylinder having enlarged radial flanges at each end connected to said shell.

ARTHUR C. RUGE.

No references cited.